US009037636B2

(12) United States Patent
Kern et al.

(10) Patent No.: US 9,037,636 B2
(45) Date of Patent: May 19, 2015

(54) MANAGING SCRIPT FILE DEPENDENCIES AND LOAD TIMES

(75) Inventors: Jonathan Fred Kern, Kirkland, WA (US); Zachary Nation, Seattle, WA (US); Alan T. Norbauer, Boston, MA (US); Frank Feng-Chun Chiang, Brighton, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 330 days.

(21) Appl. No.: 13/353,320

(22) Filed: Jan. 19, 2012

(65) Prior Publication Data

US 2013/0191439 A1    Jul. 25, 2013

(51) Int. Cl.
*G06F 15/16* (2006.01)
*G06F 9/52* (2006.01)

(52) U.S. Cl.
CPC .. *G06F 9/52* (2013.01); *G06F 15/16* (2013.01)

(58) Field of Classification Search
CPC ................................. H04L 63/10; G06F 9/50
USPC ................... 709/201–203, 223–224
See application file for complete search history.

(56) References Cited

U.S. PATENT DOCUMENTS

| | | | |
|---|---|---|---|
| 6,449,638 B1 * | 9/2002 | Wecker et al. | 709/217 |
| 6,990,653 B1 * | 1/2006 | Burd et al. | 717/108 |
| 7,689,665 B2 * | 3/2010 | Lipton et al. | 709/217 |
| 7,895,571 B2 * | 2/2011 | Fried et al. | 717/115 |
| 8,438,474 B1 * | 5/2013 | Lloyd | 715/234 |
| 8,443,346 B2 * | 5/2013 | Sanford et al. | 717/139 |
| 8,504,913 B2 * | 8/2013 | Marchant et al. | 715/255 |
| 8,700,611 B2 * | 4/2014 | Kelshikar et al. | 707/722 |
| 8,881,105 B2 * | 11/2014 | Quilter, Jr. | 717/124 |
| 2003/0014397 A1 * | 1/2003 | Chau et al. | 707/3 |
| 2003/0131084 A1 * | 7/2003 | Pizzorni et al. | 709/223 |
| 2004/0113938 A1 * | 6/2004 | Akerfeldt | 345/738 |

(Continued)

FOREIGN PATENT DOCUMENTS

| | | |
|---|---|---|
| EP | 1886235 A2 * | 2/2008 |
| KR | 10-2007-0049095 A | 5/2007 |
| KR | 10-2008-0087865 A | 10/2008 |

OTHER PUBLICATIONS

Mohapatra et al., "WebGraph: a framework for managing and improving performance of dynamic Web content," Sep. 2002, IEEE Journal on Selected Areas in Communications, vol. 20, No. 7, pp. 1414-1425.

(Continued)

*Primary Examiner* — Anthony Mejia
*Assistant Examiner* — Janakkumar Patel
(74) *Attorney, Agent, or Firm* — Tom S Wong; Jim Ross; Micky Minhas

(57) ABSTRACT

Concepts and technologies are described herein for managing script file dependencies and load times. In accordance with the concepts and technologies disclosed herein, a server computer stores pages and provides the pages to a client device. The pages can reference and/or rely upon one or more script files during execution and/or rendering. The server computer can determine script file dependencies and load levels associated with the script files. The server computer can generate data such as a directed graph and/or a table that can indicate script file dependencies and script file load levels. The data can be provided to a client device or other entity for use during loading, rendering, and/or execution of the pages.

20 Claims, 7 Drawing Sheets

(56) References Cited

U.S. PATENT DOCUMENTS

| | | | |
|---|---|---|---|
| 2005/0050164 A1* | 3/2005 | Burd et al. | 709/217 |
| 2007/0162903 A1* | 7/2007 | Babb et al. | 717/154 |
| 2008/0201705 A1 | 8/2008 | Wookey | |
| 2008/0235325 A1* | 9/2008 | Calvert et al. | 709/203 |
| 2008/0271046 A1 | 10/2008 | Lipton et al. | |
| 2008/0307394 A1 | 12/2008 | Marchant | |
| 2009/0031210 A1 | 1/2009 | Backhouse | |
| 2009/0049120 A1* | 2/2009 | Sakairi et al. | 709/203 |
| 2010/0125762 A1* | 5/2010 | Nie et al. | 714/49 |
| 2011/0066457 A1 | 3/2011 | Chang et al. | |
| 2012/0005568 A1* | 1/2012 | Prebble | 715/234 |
| 2014/0143310 A1* | 5/2014 | Peled | 709/203 |

OTHER PUBLICATIONS

Markbåge, Sebastian, "Choosing JavaScript Module Dependency Syntax," Oct. 8, 2011, Retrieved at <<http://blog.calyptus.eu/seb/2011/10/choosing-a-javascript-module-syntax/>>, 10 Pages.

Holder, Joel, "A Small Javascript to Safely Load Scripts and Styles Into the DOM," Jan. 19, 2010, Retrieved at <<http://uberpwn.wordpress.com/2010/01/19/a-small-javascript-to-safely-load-scripts-and-styles-into-the-dom/>>, 4 Pages.

"State management", Retrieved Nov. 24, 2011 at <<http://www.metaobjects.ca/csogateway/release/0.7.0.1/Help/html/a95fef80-d030-4771-bbca-3f8345e95985.htm>>, 1 Page.

"International Search Report", Mail Date: Apr. 30, 2013, Application No. PCT/US2013/021614, Filed date: Jan. 16, 2013, pp. 9.

* cited by examiner

MANAGING SCRIPT FILE DEPENDENCIES AND LOAD TIMES

BACKGROUND

Web applications and sites sometimes use client-side script files and/or other client-side executable code to provide logic associated with the applications and/or sites. Web pages and applications can include references to the script files. As such, a list of script files that are relevant to a particular page or application can be indicated in a file stored at or accessible by the client. These files and/or lists may be compiled and/or changed manually by site operators or other entities.

Some web applications and/or web sites may rely upon a large number of client-side script files. It may be undesirable and/or impractical to store and/or load a single script file that includes all functionality associated with a web application or web site due to performance issues and/or computing and other resource limitations. As such, the client-side functionality sometimes is broken into multiple files, some, none, or all of which may depend upon other script files to provide functionality associated with the web applications or sites. Thus, applications and/or pages may include references to one or more script files that may be used during rendering of a particular page associated with a site or application.

If more than one script file is referenced in a particular page associated with a site or application, the order in which the script riles are loaded also may be important. In particular, to execute a first script file having a dependency upon a second script file, the second script file may need to be loaded prior to execution of the first script file. Thus, a load order associated with script files may affect functionality associated with a web page or application.

Additionally, script files may be loaded during rendering of a page at a point of time in which the script file reference is executed during rendering. A script file reference may exist in a header of a web page or elsewhere in a page body, or the like. As such, managing script file dependencies can require time consuming manual processes.

It is with respect to these and other considerations that the disclosure made herein is presented.

SUMMARY

Concepts and technologies are described herein for managing script file dependencies and load times. In accordance with the concepts and technologies disclosed herein, a server computer can store applications, files, web sites, or other resources ("pages") and provides the pages to a client device in communication with the server computer via a network. The pages can rely upon one or more client-side script files ("script files") during execution and/or rendering to provide the functionality associated with the pages. The pages can include references to the script files so the script files can be loaded at various times during loading, rendering, and/or interactions with the pages.

According to various embodiments, the server computer can execute a server application to host the pages and to analyze the pages and script files to determine script file dependencies and load levels associated with the script files. As used herein, "load levels" can include points in time or stages at which script files are loaded before, during, or after rendering, loading, and/or executing the pages referencing the script files. As such, load levels can indicate load times associated with script files. Furthermore, when multiple load levels for multiple script files are considered as a group, the load levels can be interpreted to indicate a load order of the script files. The server application can analyze the pages and/or script files to identify script files referenced by the pages and/or within other script files to compile a list of script files to be used in association with the pages. The server application also can be configured to determine load levels relating to times during loading, rendering, and/or interactions with the page at which the script files are to be loaded.

The server application can generate a script file directed graph and/or a table that, in combination with one another and/or independently, can be analyzed to determine script file dependencies and script file load levels. The data can be provided to a client device for use in rendering the pages. In some embodiments, the data can be stored at the server computer and/or another data storage device and provided to entities accessing the pages.

According to one aspect, a server computer can store a page having a reference to a client-side script file. The server computer can receive a command or request to analyze the page and initiates a dependency and/or load level determination in response to the command or request. The server computer can register client-side script files referenced in the page, can analyze each of the registered client-side script files to resolve dependencies between the client-side script files, and can output data indicating client-side script file dependencies and/or client-side script file load levels for storage or use by other entities.

According to some embodiments, the server computer can register client-side script files by selecting a client-side script file, adding a node to a directed graph, adding a reference to the client-side script file to a load level table, and determining if additional client-side script files are referenced in the page. Thus, a "node" can correspond to a representation of a client-side script file in the directed graph, and analysis of a node can correspond to analysis of the respective client-side script file. The analysis process can be repeated until no additional client-side script files remain for analysis. The registered client-side script files can be analyzed to resolve dependencies between the files.

In some embodiments, the server computer applies an algorithm that employs node coloring to ensure that each client-side script file is analyzed only once. As used herein, "node coloring" can include a process employed by the server computer to ensure that even if a client-side script file is referenced a number of times by a page and/or other client-side script files in the page, the particular client-side script file is registered and dependencies for the client-side script file are resolved only once. Thus, node coloring can include marking registered and/or analyzed client-side script files as registered, visited, and/or analyzed to reduce resources expended on analyzing and/or registering client-side script files. The client-side script files can be analyzed to identify dependencies and reflect the dependencies in data structures output by the server computer.

According to another aspect, the data output by the server computer can include a directed graph. The directed graph can include a node corresponding to each client-side script file referenced by the page. Edges between the nodes can indicate dependencies between the client-side script files. The data output by the server computer also can include a load level table that indicates load levels at which the client-side script files are to be loaded during rendering, loading, or interactions with the pages. The load levels can be implementation-specific and therefore can include any number of load levels.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
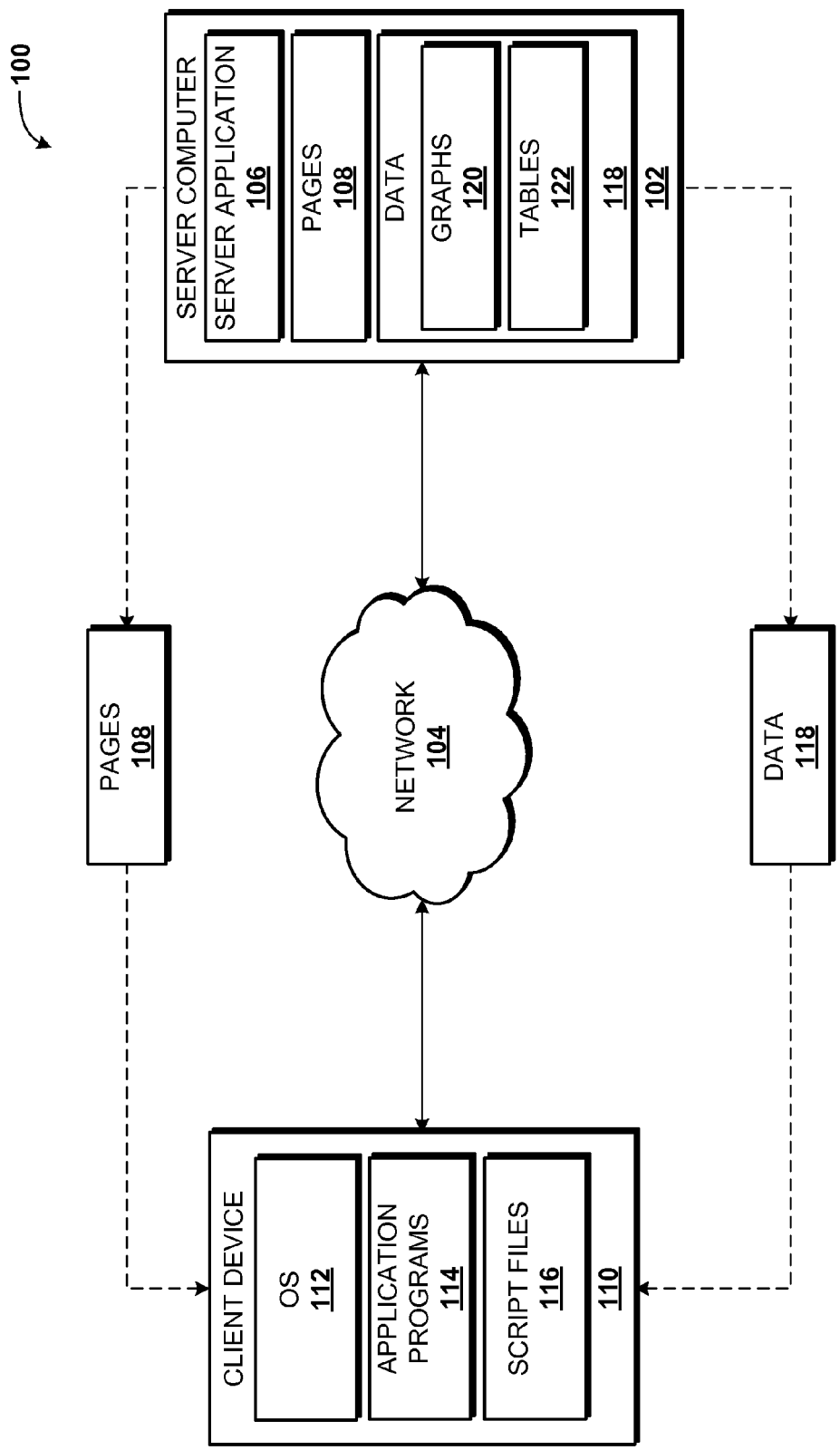
FIG. 1 is a system diagram illustrating an illustrative operating environment for the various embodiments disclosed herein.

The following detailed description is directed to concepts and technologies for managing script file dependencies and load times. According to the concepts and technologies described herein, a server computer stores a page or other resource having a reference to a script file. The server computer analyzes the page and initiates a script file dependency determination and/or a script file load level determination. The server computer can register script files referenced in the page, analyze each of the registered script files to resolve dependencies between the script files, and output data indicating script file dependencies and/or script file load levels. The data output by the server computer can include a directed graph and/or a table. The directed graph can include nodes corresponding to each of the script files referenced by the page or other script files referenced by the page. Edges between the nodes can indicate dependencies between the script files. The data output by the server computer also can include a load level table that indicates load levels at which the script files are to be loaded during rendering, loading, or interactions with the pages. The load levels can be implementation-specific and therefore can include any number of load levels.

According to some embodiments, the server computer registers script files by selecting a script file, adding a node to the directed graph, adding a reference to the script file to the load level table, and determining if additional script files are referenced in the page. The process can be repeated until no additional script files remain for analysis. The registered script files can be analyzed to resolve dependencies between the files. The server computer can apply an algorithm that employs node coloring to ensure that each script file is analyzed only once to reduce latency and/or resource usage during the analysis. The script files can be analyzed to identify dependencies and reflect the dependencies in the data output by the server computer.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for managing script file dependencies and load times will be presented.

Referring now to FIG. 1, aspects of one operating environment 100 for the various embodiments presented herein will be described. The operating environment 100 shown in FIG. 1 includes a server computer 102 operating as a part of, or in communication with, a communications network ("network") 104. The server computer 102 is configured to execute an operating system (not illustrated in FIG. 1) and one or more application programs such as, for example, a server application 106 and/or other application programs.

The operating system is a computer program for controlling the operation of the server computer 102. The server application 106 is an executable program configured to execute on top of the operating system to provide the functionality described herein for managing script file dependencies and/or script file load times. According to various embodiments, the server computer 102 is configured to provide functionality associated with a web server and can be configured to host one or more pages, sites, applications, and/or other resources via one or more pages ("pages") 108. The pages 108 therefore can relate to one or more applications, web sites, web pages, and/or other resources.

The pages 108 can be provided to one or more devices or other entities in communication with the server computer 102 such as a client device 110. According to various embodiments, the functionality of the client device 110 is provided by a personal computer ("PC") such as a desktop, tablet, or laptop computer system. The functionality of the client device 110 also can be provided by other types of computing systems including, but not limited to, server computers, handheld computers, netbook computers, embedded computer systems, personal digital assistants, mobile telephones, smart phones, or other computing devices. For purposes of describing the concepts and technologies disclosed herein, the client device 110 is described as a PC, it should be understood that this embodiment is illustrative, and should not be construed as being limiting in any way.

According to various embodiments, the client device 110 executes an operating system 112 and one or more application programs 114. The application programs can provide various functionality such as, for example, word processing programs, web browsers, and the like. For purposes of describing the concepts and technologies disclosed herein, the application programs 114 are described herein as a web browser used to access and/or use the pages 108 described above. As such, the client device 110 can, via access of the pages 108, provide functionality associated with one or more web applications and/or web sites to users of the client device 110.

According to various embodiments, the client device 110 is configured to store one or more client-side script files ("script files") 116. The script files 116 can include various application components, application modules, extensions, web add-ins, other files, and/or other types of executable code. In some embodiments, for example, the script files 116 include executable code formatted in various script languages such as, for example, JAVASCRIPT, VBSCRIPT, XML User Interface Markup Language ("XUL"), Extensible Stylesheet Language Transformations ("XSLT"), other languages, and the like. The client device 110 can use the script files 116 in conjunction with the pages 108 to provide a user of the client device 110 with functionality associated with the server computer 102. In particular, the pages 108 provided to the client device 110 may include one or more references to one or more of the script files 116. Thus, during rendering and/or other execution of the pages 108 by the client device 110, the script files 116 can be retrieved, loaded, and/or executed by the client device 110 to provide functionality associated with the server computer 102.

According to various embodiments, the pages 108 may reference the script files 116 in various locations within the pages 108. For example, the pages 108 may include a reference to one of the script files 116 in a header portion of a web page, in various locations within the web page body, and/or elsewhere within the pages 108. Thus, the client device 110 may retrieve, load, and/or execute the script files 116 at various times during rendering or viewing of the pages 108. According to various embodiments, the client device 110 receives one of the pages 108 including one or more references to one or more of the script files 116. Furthermore, the pages 108 can include multiple references to one or more of the script files 116. In some instances, a particular script file 116 referenced in one of the pages 108 may depend upon another script file 116. As such, the client device 110 may retrieve, load, and/or execute script files 116 as referenced in the pages 108. In some instances, loading script files 116 in a particular load order may enhance performance of the client device 110 during rendering and/or interactions with the pages 108.

In particular, if a first script file 116 in a particular page 108 is depended upon by a second script file 116, a load order of the script files 116 may be an important consideration for providing a reliable user experience during rendering of the page 108. For example, if the second script file 116 is executed prior to loading of the first script file 116, the client device 110 may load the first script file 116 during execution of the second script file 116. Latency experienced during loading of the first script file 116 can be undesirable, Additionally, or alternatively, execution of the second script file 116 may fail or may be interrupted if a referenced script file 116 is not loaded prior to execution of the second script file 116.

As such, embodiments of the concepts and technologies disclosed herein include identifying dependencies of script files 116 or other client-side executable code and determining a load order for the script files 116. According to various embodiments, the server application 106 is configured to analyze the pages 108, identify script files 116 referenced by the pages 108, and generate data 118 for specifying dependencies and/or load orders associated with the script files 116 referenced within the pages 108.

According to various embodiments, the server computer 102 generates, via execution of the server application 106, directed graphs ("graphs") 120 and/or tables or lists ("tables") 122 that specify the determined dependencies and/or load levels, load times, and/or load orders ("load levels"). These and other forms of the data 118 can be provided to the client device 110 with, or in addition to, the pages 108. As such, the client device 110 can determine, via analysis of the data 118, an order in which the script files 116 are to be loaded during rendering and/or other execution of the pages 108. By loading the script files 116 in an order specified by the data 118, the client device 110 can provide interactions associated with the pages 108 with improved reliability and/or latency, relative to merely accessing, loading, and/or executing the script files 116 when referenced by the pages 108.

In other embodiments, the server computer 102 generates script tags and/or other references for output into the pages 108. For example, the server computer 102 can determine, based upon resolving various script file dependencies and determine load levels or the like, that a particular script file 116 is to be loaded in a page header. As such, the server computer 102 can be configured to generate output indicating this determination. In this example, the server computer 102 can generate, for example, a <script> tag or other reference and embed the <script> tag in the <head> of the page 108. It should be understood that this embodiment is illustrative, and should not be construed as being limiting in any way. In some embodiments, the server computer 102 need not provide output to the client device 110 other than the references output into the pages 108. As such, the client device 110 may or may not be aware of the script file dependency determinations described herein, and instead can merely execute the page 108 in a traditional manner. In some embodiments, however, script file 116 load levels and dependencies may have been resolved for optimal performance by the server computer 102, as disclosed herein.

As will be explained in more detail herein, the server computer 102 is configured to generate the data 118 by analyzing the pages 108 and/or applying one or more algorithms to the code associated with the pages 108. Via this analysis, the server computer 102 can identify script files 116 referenced by the analyzed pages 108; determine dependencies between the script files 116, if any; and determine, based upon these and/or other factors, a load order for the script files 116 included in the pages 108. These and other functions of the server computer 102 can be executed or accessed on-demand, when a command or request is received, according to one or more schedules, when changes to the pages 108 are made or detected, and/or at other times. The server computer 102 can store the data 118 at a data storage device associated with the server computer 102 and/or at a data storage device accessible by the server computer 102 (not shown in FIG. 1).

According to various embodiments, the server computer 102 initiates a dependency determination and begins analysis of the pages 108. During a first operation, the server computer 102 identifies nodes, or script files 116, within the code corresponding to the pages 108. During registration of the nodes, the server computer 102 can search the code for references to the script files 116, and can add a node corresponding to the script file 116 to a graph 120 associated with the page 108. The server computer 102 also can add a reference to the script file 116 in a table 122 associated with the page 108. Thus, the server computer 102 can generate a graph 120 and a table 122 that includes a node or other representation for each script file 116 referenced by a particular page 108.

The server computer 102 also can be configured to resolve dependencies between the script files 116. In particular, the server computer 102 can obtain an XML manifest, list, or other data indicating script file dependencies that can be referenced during runtime or at other times to determine the script file dependencies. In some embodiments, the server computer 102 enables manual description of script file dependencies at runtime or at other times. In some embodiments, the server computer 102 can analyze each script file 116 reference within the page 108 to determine if a particular script file 116 depends upon other script files 116.

In some embodiments, the server computer 102 recluses each node or script file 116 identified in a page 108 to resolve dependencies and determine a load order for script files 116 referenced by the page 108 and/or completes similar steps based upon the XML manifest, list, or other file as explained above. During processing server-side executable code corresponding to the page 108 and/or otherwise registering the script files 116 for a particular page 108, the server computer 102 can add nodes corresponding to the script files 116 to one or more various data structures such as, for example, the tables 122 and/or the graphs 120 mentioned above. After registration, the server computer 102 can generate output for implementing the determined script file 116 dependencies and/or load levels.

During output, which is described in more detail below, the server computer 102 can be configured to process the data structures. For example, the server computer 102 can process the graphs 120. In some embodiments, the server computer 102 processes the graphs 120 using node coloring. In some embodiments, the server computer 102 registers the script files 116 by adding references to the table 122 and then adds a reference to the script files 116 in the graph 120. The server computer 102 can color the node added to the graph 120, resolve its dependencies, and visit each of child node associated with the node. After visiting the child nodes for a given node, the server computer 102 can output an appropriate script reference for that script file 116 into the page output.

In some embodiments, the server computer 102 employs node coloring to ensure that the analysis associated with resolving node dependencies are provided one time only with respect to each node. As used herein, "node coloring" can include a process used by the server computer 102 to reduce time and resources expended during the analyses described herein. By using "node coloring," the server computer 102 can ensure that even if a particular script file 116 is referenced a number of times within or by a page 108, graph 120, table 122, other data structure, and/or other script files 116 referenced within the page 108, the particular script file 116 or node associated therewith can be registered and dependencies for the script file 116 can be resolved only once.

In some implementations, for example, the server computer 102 selects a node in a graph 120 associated with a script file 116 referenced in the page 108 and determines if the node previously has been visited. If the node previously has been visited, the server computer 102 can end analysis of that node. If the node previously has not been visited, the server computer 102 can "color" the node as visited and resolve dependencies associated with the node. After resolving dependencies between each identified node within a page 108, the server computer 102 can output the data 118 and/or store the data 118 at a data storage device.

The server computer 102 can provide the data 118 to the client device 110. The data 118 can be provided with the pages 108 and/or separately at various times, according to user preferences, settings, and/or other considerations. The client device 110 can use the data 118 to determine a load order for the script files 116 associated with the pages 108. As such, the client device 110 can load the script files 116 in an order that can, according to some embodiments, provide the functionality associated with the pages 108 with optimal performance and/or reliability by loading the script files 116 in a theoretically best order. These and other aspects of managing dependencies and load times of script files 116 are discussed in more detail below, particularly with reference to FIGS. 2-6.

FIG. 1 illustrates one server computer 102, one network 104, and one client device 110. It should be understood, however, that some implementations of the operating environment 100 include multiple server computers 102, multiple networks 104, and/or multiple client devices 110. Thus, the illustrated embodiments should be understood as being illustrative, and should not be construed as being limiting in any way.

Figure 2:
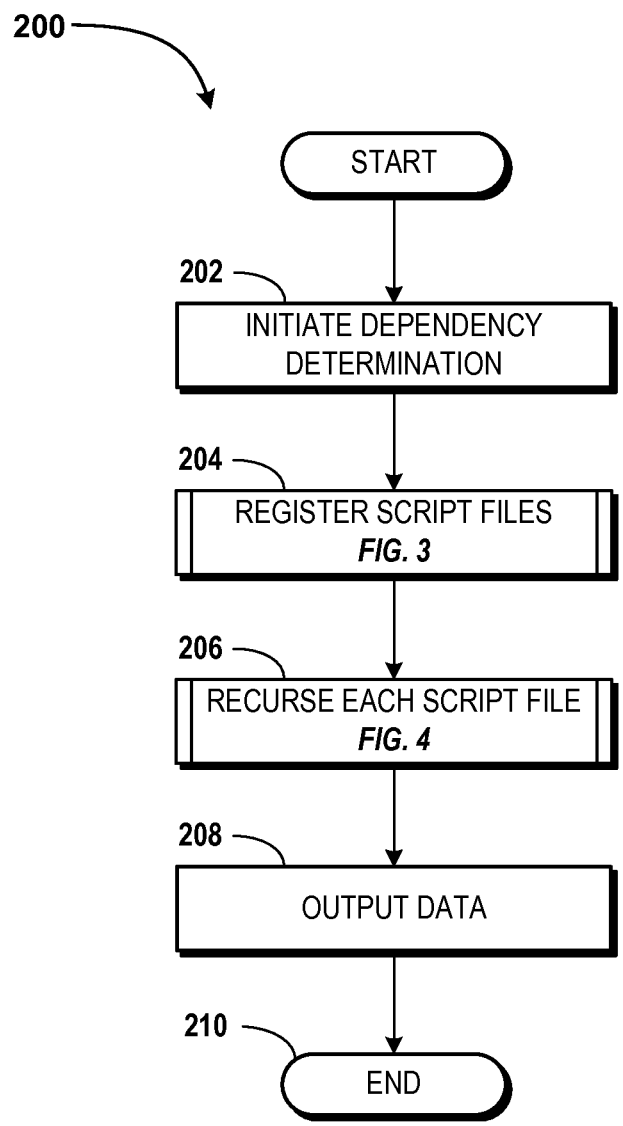
FIG. 2 is a flow diagram showing aspects of a method for managing script file dependencies and load times, according to an illustrative embodiment.

Turning now to FIG. 2, aspects of a method 200 for managing script file dependencies and load times will be described in detail. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by the server computer 102. It should be understood that these embodiments are illustrative, and should not be viewed as being limiting in any way. The method 200 begins at operation 202, wherein the server computer 102 initiates a script file dependency determination and/or a script file load time determination associated with a particular page 108 or other resource. In some embodiments, the server computer 102 receives a command to determine script file dependencies and/or to determine load times for the script files 116 from a client of the server computer 102 such as the client device 110, an administrator, site operator, or other entity, or from elsewhere.

The server computer 102 also can initiate the dependency and/or load time determinations based upon a request for a resource such as the page 108. The request can be received from an application call, arrival or execution of a scheduled event, and/or in response to various other requests or commands for prompting the server computer 102 to execute the functionality described herein. Because the functionality described herein can be provided at various times, in response to various commands, and/or based upon various other considerations, it should be understood that these embodiments are illustrative, and should not be construed as being limiting in any way.

From operation 202, the method 200 proceeds to operation 204, wherein the server computer 102 registers script files 116 associated with the page 108. According to various embodiments, the server computer 102 is configured to call several functions and/or to execute one or more algorithms to analyze code corresponding to the page 108. During analysis of the code corresponding to the page 108, the server computer 102 can identify references to script files 116 within the page 108. Each identified script file 116 can be added to a directed graph such as the graph 120 and a list, manifest, or table such as the table 122. Registration of the script files 116 is described in more detail below with reference to FIG. 3.

From operation 204, the method 200 proceeds to operation 206, wherein the server computer 102 recurses each script file 116 registered in operation 204. "Recursing," as used herein, refers to analyzing each of the script files 116 identified in operation 204 and resolving dependencies associated with each of the script files 116. Furthermore, during the recursing, any script files 116 referenced by the script file 116 being recursed also are analyzed and dependencies of these script files 116 also can be resolved. As such, during the recursion of each script file 116, arty script file 116 dependencies can be resolved, whether the script file references occur within the page 108 and/or are referenced by script files 116 referenced by the page 108. Thus, during recursing of the script file 116, multiple script files 116 may be analyzed by the server computer 102.

According to various embodiments, the server computer 102 is configured to use node coloring during the recursing operation to visit each node or script file 116 once, and in some embodiments, only once. As such, embodiments of the concepts and technologies disclosed herein allow identification and dependency resolution in an efficient and thorough manner by limiting analysis of each script file 116 to one operation. Recursing of the script files 116 is described in more detail below with reference to FIG. 4.

From operation 206, the method 200 proceeds to operation 208, wherein the server computer 102 generates output. In some embodiments, the output generated by the server computer 102 includes outputting script references in page output associated with the page 108. For example, the output can include a <script> tag in the <head> of the page output or elsewhere in the page 108, as determined. In other embodiments, the output generated in operation 210 cart include, but is not limited to, the data 118 described above with reference to FIG. 1. As such, the output generated in operation 210 can include the graphs 120 and/or the tables 122 mentioned above and described in more detail below with reference to FIGS. 5-6. Briefly, the graphs 120 and the tables 122 can include data structures that can be output by the server computer 102 and transmitted to the client device 110.

The client device 110 can use the graphs 120 and/or the tables 122 to determine a load order for the script files 116. As such, the data 118 output in operation 208 can be used to load script files 116 in an order determined by the server computer 102 based upon script file dependencies and/or other considerations. The data 118 can be stored at the server computer 102, at a data storage device accessible by the server computer 102, and/or transmitted to the client device 110 with or without storage by the server computer 102. From operation 208, the method 200 proceeds to operation 210. The method 200 ends at operation 210.

Figure 3:
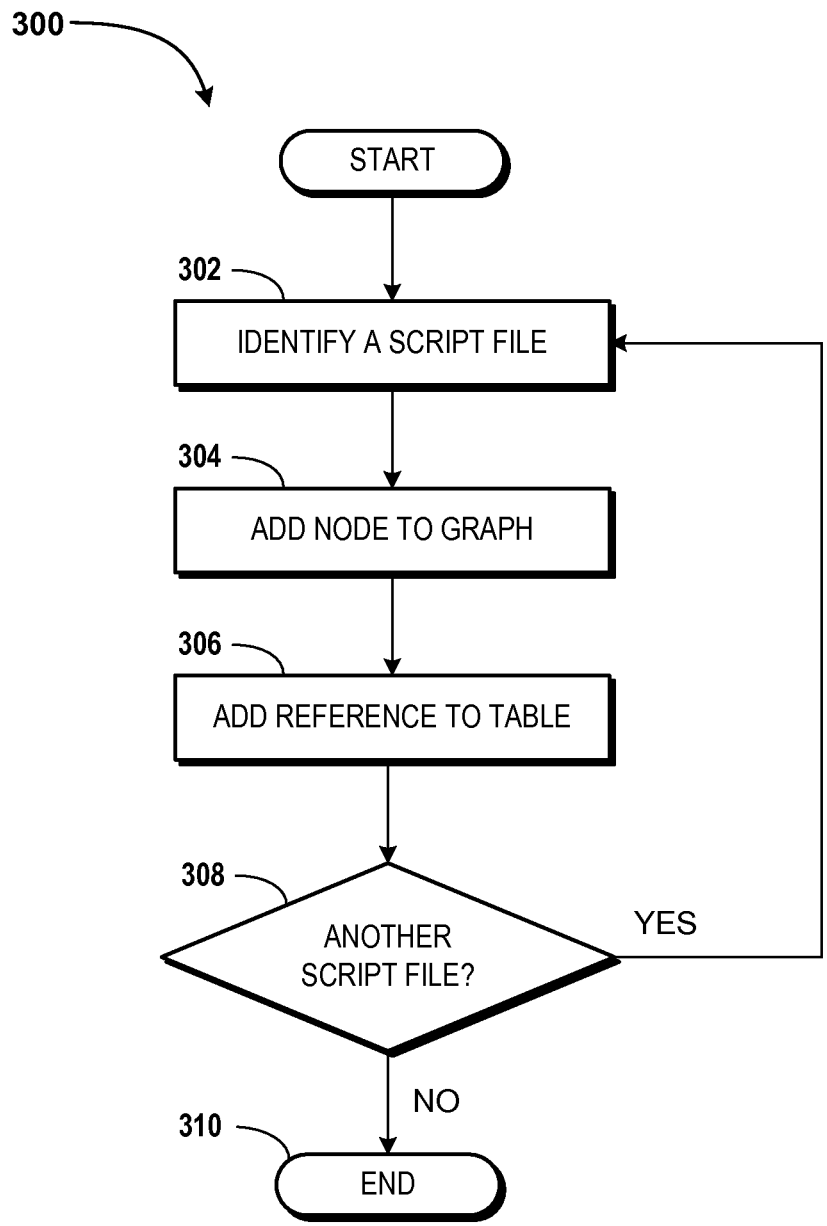
FIG. 3 is a flow diagram showing aspects of a method for registering script files associated with a page, according to an illustrative embodiment.

Turning now to FIG. 3, aspects of a method 300 for registering script files associated with a page will be described in detail. As noted above with reference to FIG. 2, the operations described herein with reference to FIG. 3 can be, but are not necessarily, executed in operation 204 of the method 200. As such, it should be understood that the embodiment of FIG. 3 described herein is illustrative, and should not be construed as being limiting in any way.

The method 300 begins at operation 302, wherein the server computer 102 identifies a script file 116 within a particular page 108. The server computer 102 cart begin analysis of the page 108 at various locations within the code associated with the page 108 to search for and identify the script files 116. In some embodiments, the server computer 102 starts the analysis of operation 302 at the beginning of the code associated with the page 108. In other embodiments, the server computer 102 starts the analysis with the header, body, or other portion of the source code associated with the page 108, and in yet other embodiments the analysis begins at a random entry point. The determination as to where to begin the analysis of the page 108 can be made according to user settings or other options, as well as other considerations. Regardless of how and/or where the analysis begins, the server computer 102 can analyze the page 108 and identify the script files 116.

The server computer 102 can be configured to recognize references to the script files 116 within the page 108 based upon file formats, extensions, or the like. In other embodiments, the server computer 102 generates calls to a Register in server-side executable code associated with the page 108 and identifies the script files 116 without searching for the script files 116 and/or analyzing the page 108 to identify the script files 116. In some embodiments, as mentioned above, the script files 116 may be JAVASCRIPT files and therefore can have a .js extension. Thus, the server computer 102 can recognize the references to the script files, for example, by searching the page 108 for the text ".js," corresponding to a JAVASCRIPT extension. Because other formats and/or types of script files 116 are possible and are contemplated, it should be understood that this embodiment is illustrative, and should not be construed as being limiting in any way.

From operation 302, the method 300 proceeds to operation 304, wherein the server computer 102 adds a node corresponding to the script file 116 identified in operation 302 to a directed graph such as the graph 120. Nodes are illustrated and described in more detail below with reference to FIG. 5. Briefly, the server computer 102 can add a representation of the script file 116 identified in operation 302 to a directed graph. The dependencies associated with the script file 116 can be determined during a dependency resolution process such as the method 400 described below with reference to FIG. 4. As such, the nodes and dependencies between nodes can be included in a directed graph. Directed graphs will be illustrated and described in more detail below with reference to FIGS. 4-5.

From operation 304, the method 200 proceeds to operation 306, wherein the server computer 102 adds a reference to the script file 116 identified in operation 302 to a list, manifest, table, or other data structure such as the table 122. In some embodiments, the reference to the script file 116 includes an identification of the script file 116 by name. The reference to the script file 116 can be added to the table 122 at a load level associated with the script file 116. In some embodiments, the load level associated with the script file 116 can be determined during recursing of the script file 116, as will be illustrated and described in more detail below with reference to FIG. 4. As such, the reference added to the table 122 in operation 306 may or may not include a load level indication and therefore may or may not be refined during recursing of the nodes and/or script files 116 as described below in more detail below.

From operation 306, the method 300 proceeds to operation 308, wherein the server computer 102 determines if the page 108 includes additional script files 116. According to embodiments, the server computer 102 can analyze the page 108 to determine a number of script files 116 included in the page 108 and/or can identify a script file 116 in the page 108 and continue searching the page 108 for an additional script file 116. As such, operation 308 can include analyzing the page 108 to search for an additional script file 116 and/or determining if each script file 116 identified in the page 108 has been registered. If the server computer 102 determines, in operation 308, that an additional script file 116 is included in the page 108, the method 300 can return to operation 302, wherein the server computer 102 can identify another script file 116. The operations 302-308 can be repeated until the server computer 102 determines, in any iteration of operation 308, that another script file 116 is not included in the page 108.

If the server computer 102 determines, in any iteration of operation 308, that another script file 116 is not included in the page 108, the method 300 proceeds to operation 310. The method 300 ends at operation 310.

According to one contemplated embodiment, the server computer 102 provides some, all, or none of the functionality described above with reference to the method 300 via execution of computer-executable code. One embodiment of the computer-executable code is presented below in TABLE 1. The computer-executable code presented in TABLE 1 can be, but is not necessarily, based upon assumed globals and defined functions, as shown in TABLE 2. Because the example code and the examples of globals and defined functions are merely illustrative of one contemplated example, these examples should not be construed as being limiting in any way.

TABLE 1

Register (Node n, LoadLevel 1):
    Add (g, n)
    AddToList(t[l], n)
RegisterDependency (Node n, Node m):
    AddEdge (g, n, m)

TABLE 2

Globals:
    DirectedGraph g

TABLE 2-continued

Table<LoadLevel, List<Node>> t
Defined Functions:
    void Add(DirectedGraph, Node)
    void AddEdge(DirectedGraph, Node, Node)
    List<T> GetKeys(Table<T, U>)
    void SetVisited(Node, bool)
    bool GetVisited(Node)
    T [ ](Table<LoadLevel, T>, LoadLevel)
    void AddToList(List<T>, T)

Figure 4:
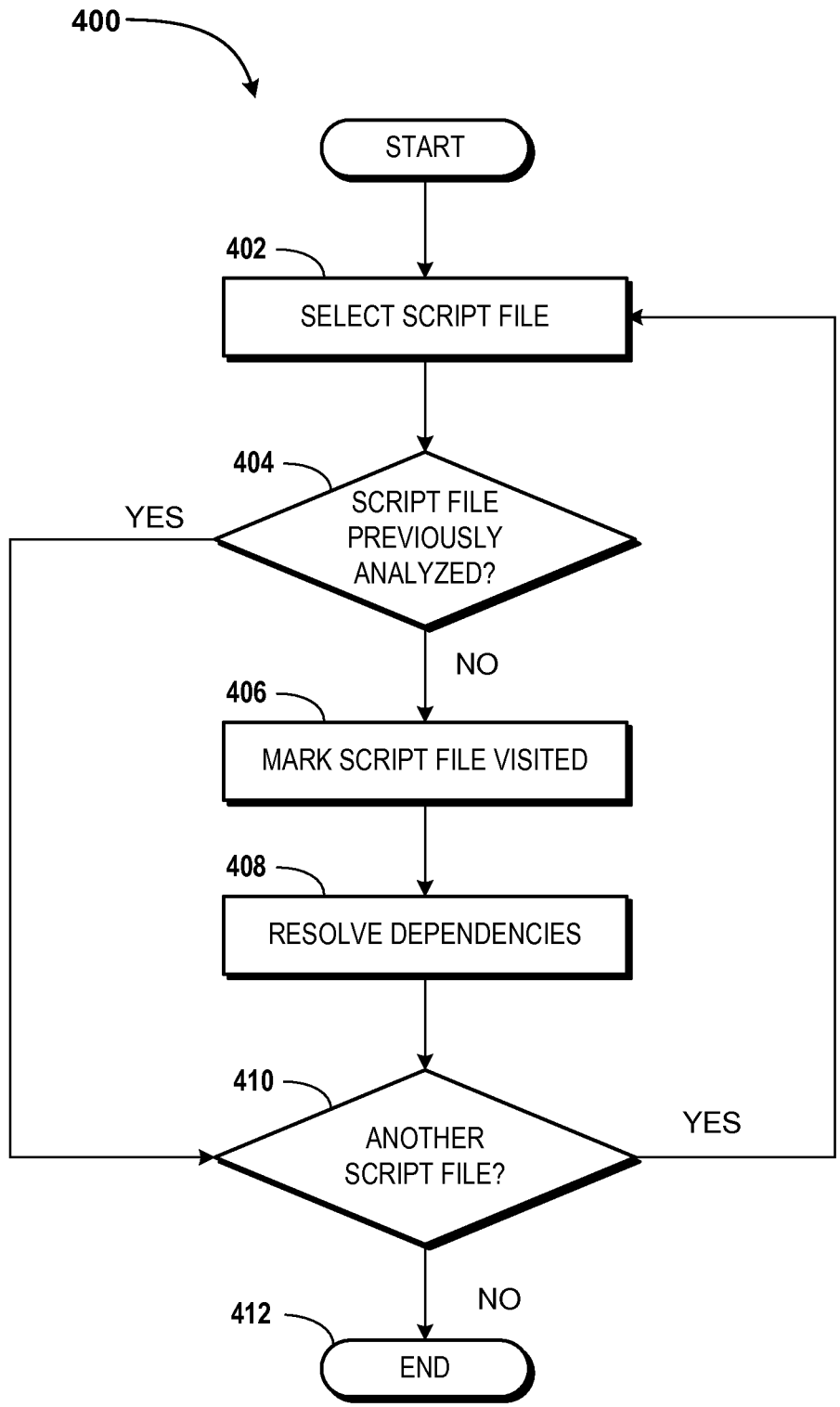
FIG. 4 is a flow diagram showing aspects of a method for resolving script file dependencies, according to an illustrative embodiment.

Turning now to FIG. 4, aspects of a method 400 for resolving script file dependencies will be described in detail. As noted above with reference to FIG. 2, the operations described herein with reference to FIG. 4 can be, but are not necessarily, executed in operation 206 of the method 200. As such, it should be understood that the embodiment illustrated in FIG. 4 is illustrative, and should not be construed as being limiting in any way.

The method 400 begins at operation 402, wherein the server computer 102 selects a script file 116 from a page 108. As explained above with reference to FIG. 3, the server computer 102 can analyze the page 108 to identify script files 116 in the page 108 and/or can begin analyzing the page 108 and identify a first script file 116 in the page 108. Regardless of how the script rile 116 is identified by the server computer 102, one of the one or more script files 116 in the page 108 can be selected by the server computer 102 in operation 402.

From operation 402, the method 400 proceeds to operation 404, wherein the server computer 102 determines if the script file 116 selected in operation 402 previously has been analyzed by the server computer 102. As mentioned above, the server computer 102 can be configured to apply node coloring to script files 116 in a page 108 to limit analysis of a particular script file 116 to a single iteration or instance of analysis. As such, some embodiments of the server computer 102 are configured to analyze the page 108 in an efficient manner that prevents analysis of a particular node or script file 116 more than one time.

If the server computer 102 determines, in operation 404, that the script file 116 selected in operation 402 has been analyzed previously, the server computer 102 can skip further analysis of the script file 116, as will be explained below. If the server computer 102 determines, in operation 404, that the script file selected in operation 402 has not previously been analyzed, the method 400 proceeds to operation 406.

In operation 406, the server computer 102 marks the script file 116 as visited or analyzed. The functionality of the server computer 102 for marking a node or script file 116 as having been visited and/or analyzed is referred to herein as "node coloring." The node coloring functionality described herein can be implemented by the server computer 102 to ensure that a particular node and/or script file 116 is analyzed only one time in the method 400. As such, the node coloring can be implemented by the server computer 102 to limit the number of load level updates that occur during the script file dependency and load level determinations described herein. As such, the node coloring described herein can improve efficiency and/or reliability of the script file dependency and/or load level determinations by the server computer 102.

From operation 406, the method 400 proceeds to operation 408, wherein the server computer 102 resolves dependencies associated with the script file 116. In particular, the server computer 102 analyzes each script file 116 and determines if the script file 116 depends upon, or is depended upon by, any other script files 116. In some embodiments, the server computer 102 receives an XML manifest, a list, or other data indicating script file dependencies and/or determines the dependencies by analyzing the page 108. References to script files 116 also can exist within the page 108 and/or within the script files 116 themselves. As such, the server computer 102 can, via analysis of the page 108 and/or the script files 116, determine the dependencies of one or more script files 116. If other script files 116 are referenced by a script file 116 for which dependencies are being resolved, the referenced script files 116 also can be analyzed in operation 408, as explained above with respect to recursing during dependency resolution. Thus, while not shown in the FIGURES, it should be understood that the server computer 102 can store a copy of the script files 116, if desired, for the analysis described herein and/or for other purposes, and that multiple script files 116 may be analyzed during the operation 408.

From operation 408, or if the server computer 102 determines, in operation 404, that the script file 116 previously has been visited or analyzed, the method 400 proceeds to operation 410. In operation 410, the server computer 102 can determine if another script file 116 or node remains for dependency resolution. As explained above with reference to FIG. 3, the server computer 102 can analyze the page 108 to determine a number of script files 116 and/or nodes included in the page 108 and/or can identify a script file 116 or node in the page 108 and continue searching the page 108 for an additional script file 116 or node. As such, operation 410 can include the server computer 102 analyzing the page 108 to search for an additional script file 116 or node and/or determining if each script file 116 or node identified in the page 108 has been analyzed or visited. If the server computer 102 determines, in operation 410, that another script file 116 or node is to be analyzed, the method 400 can return to operation 402, wherein the server computer 102 can select another script file 116. The operations 402-410 can be repeated by the server computer 102 until the server computer 102 determines, in any iteration of operation 308, that another script file 116 is not to be analyzed.

If the server computer 102 determines, in arty iteration of operation 410, that another script file 116 is not to be analyzed, the method 400 proceeds to operation 412. The method 400 ends at operation 412.

According to one contemplated embodiment, the server computer 102 provides some, all, or none of the functionality described above with reference to the method 400 via execution of computer-executable code. One embodiment of the computer-executable code is presented below in TABLE 3. Because the example code is merely illustrative of one contemplated example, the embodiment provided in TABLE 3 should not be construed as being limiting in any way. Additionally, the example provided below is based upon an assumption that a method "Output" exists. The Output method can be tailored to take various actions, depending upon load level. As such, it should be understood that the Output method provided is merely shown to illustrate the existence of such methods and should not be construed as being limiting in any way.

TABLE 3

```
Render:
    let levels := GetKeys(t)
    For each LoadLevel l in levels
        let nodes := t[l]
        For each Node n in nodes,
            Recurse(n, l)
Recurse(Node n, LoadLevel l):
    If !GetVisited(n),
        SetVisited(n)
```

TABLE 3-continued

```
        ResolveDependencies(n)
        For each child Node e,
            Recurse(e, l)
        Output(n, l)
ResolveDependencies(Node n):
    let List<Node> list:= load the list of pre-declared
                    dependencies for n from disk or other
                    storage
    For each Node m in list,
        AddEdge(g, n, m)
    Output(Node n, LoadLevel l)
```

Figure 5:
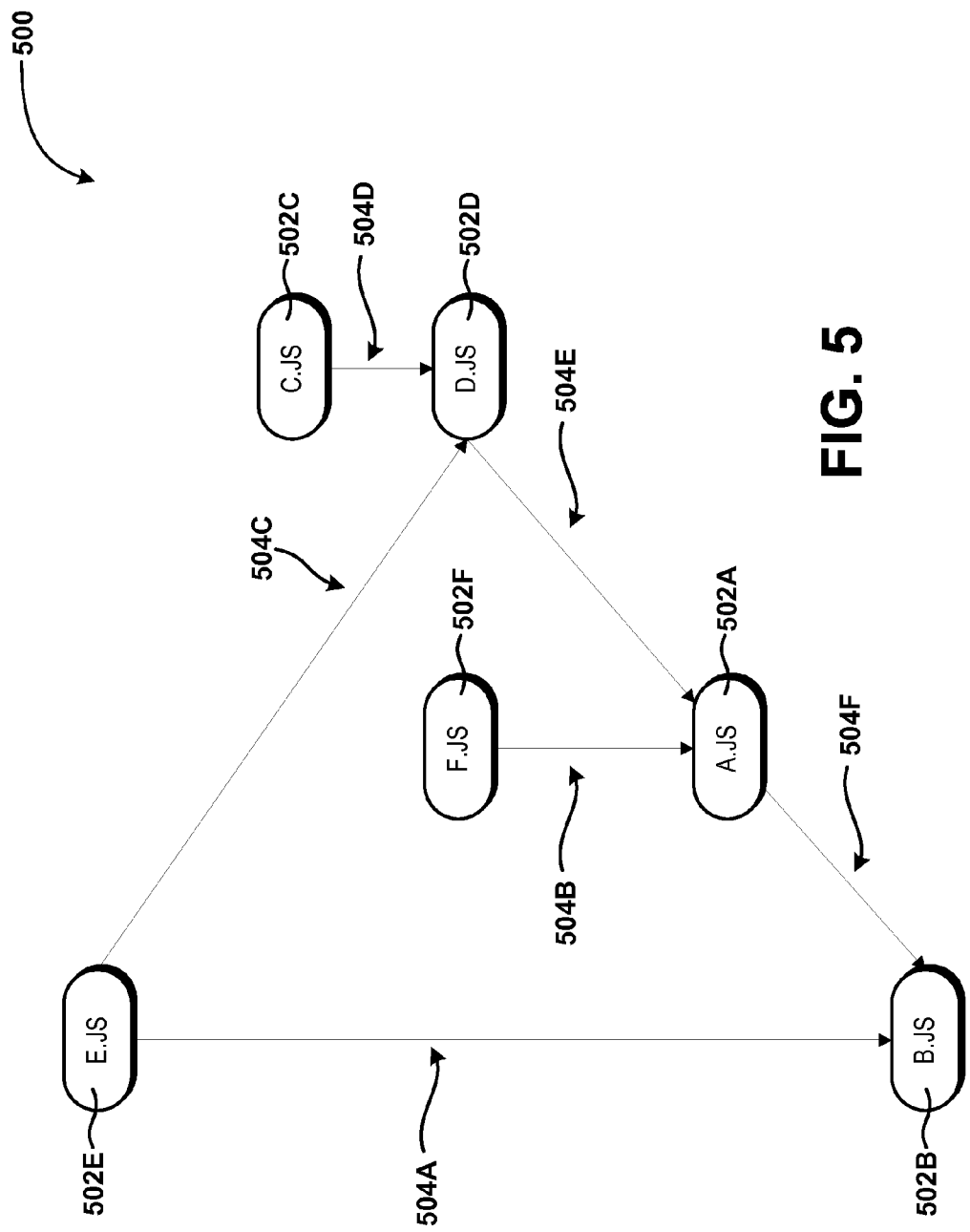
FIG. 5 is a block diagram showing a script file directed graph, according to an illustrative embodiment.

Turning now to FIG. 5, additional aspects of the concepts and technologies disclosed herein for managing script file dependencies and/or load times will be described in detail. In particular, FIG. 5 is a block diagram schematically showing a script file directed graph 500, according to an illustrative embodiment. A script file directed graph 500 can correspond to a data structure that indicates dependencies between script files 116 represented within the script file directed graph 500. It should be appreciated that the script file directed graph 500 shown in FIG. 5 is one example of the graphs 120 described above in detail. As such, the illustrated embodiment should be understood as being illustrative, and should not be construed as being limiting in any way.

As shown in FIG. 5, the script file directed graph 500 includes a number of nodes 502A-502F (hereinafter collectively and/or generically referred to as "nodes 502"). As explained above, the nodes 502 shown in FIG. 5 can correspond to script files 116 associated with a particular page 108. The example script file directed graph 500 of FIG. 5 corresponds to a graph 120 for a page 108 that references six script files 116. As explained above, this embodiment is illustrative and should not be construed as being limiting in any way.

For purposes of describing the concepts and technologies disclosed herein, the script file directed graph 500 shown in FIG. 5 will be described as corresponding to an example page 108 that includes at least six references to script files 116. It should be understood from the description herein that the nodes can include references to other nodes in addition to, or instead of the page 108 including references to the nodes 502. For example, the node 502D is illustrated as depending upon the node 502C and therefore, the node 502D can include a reference to the node 502C. In some embodiments, the server computer 102 generates the script file directed graph 500 via execution of the methods 200, 300, 400 illustrated in FIGS. 2-4. In particular, the server computer 102 can add the nodes 502 to the script file directed graph 500 via execution of the method 300 described above with reference to FIG. 3. Furthermore, the script file directed graph 500 shows dependencies between the nodes 502 via display of node edges 504A-F (hereinafter collectively and/or generically referred to as "edges 504"). The edges 504 can correspond to a dependency between script files 116, wherein the dependency is indicated by the edge 504 between two nodes 502.

In some embodiments, an arrow of the edge 504 points toward a dependent node 502. In particular, the arrow of the edge 504 can point away from a depended upon node 502 or script file 116 and/or toward a node 502 or script file 116) that depends from another node 502. For example, the node 502D corresponding to the script file 116 entitled "d.js" is illustrated, in FIG. 5, as depending from the node 502C corresponding to the script file 116 entitled "c.js" and from the node 502E corresponding to the script file 116 entitled "e.js." It should be understood that this embodiment is illustrative, and should not be construed as being limiting in any way.

As explained above, the server computer 102 can generate the script file directed graph 500 and/or other graphs 120 as well as tables, lists, manifests, and/or other data structures such as the tables 122. The tables 122 can specify a load level for each script file 116 and/or node 502 associated with a page 108. An example of a table 122 for indicating load level is illustrated and described below with reference to FIG. 6.

According to one contemplated embodiment, the server computer 102 generates the script file directed graph 500 via execution of the operations shown in TABLE 4 below. Because the example code shown in TABLE 4 and the script file directed graph 500 shown in FIG. 5 are merely illustrative of one contemplated example, the embodiment provided in TABLE 4 should not be construed as being limiting in any way.

TABLE 4

```
RegisterDependency("a.js", "b.js")
RegisterDependency("c.js", "d.js")
RegisterDependency("d.js", "a.js")
RegisterDependency("e.js", "b.js")
RegisterDependency("e.js", "d.js")
RegisterDependency("f.js", "a.js")
```

Figure 6:
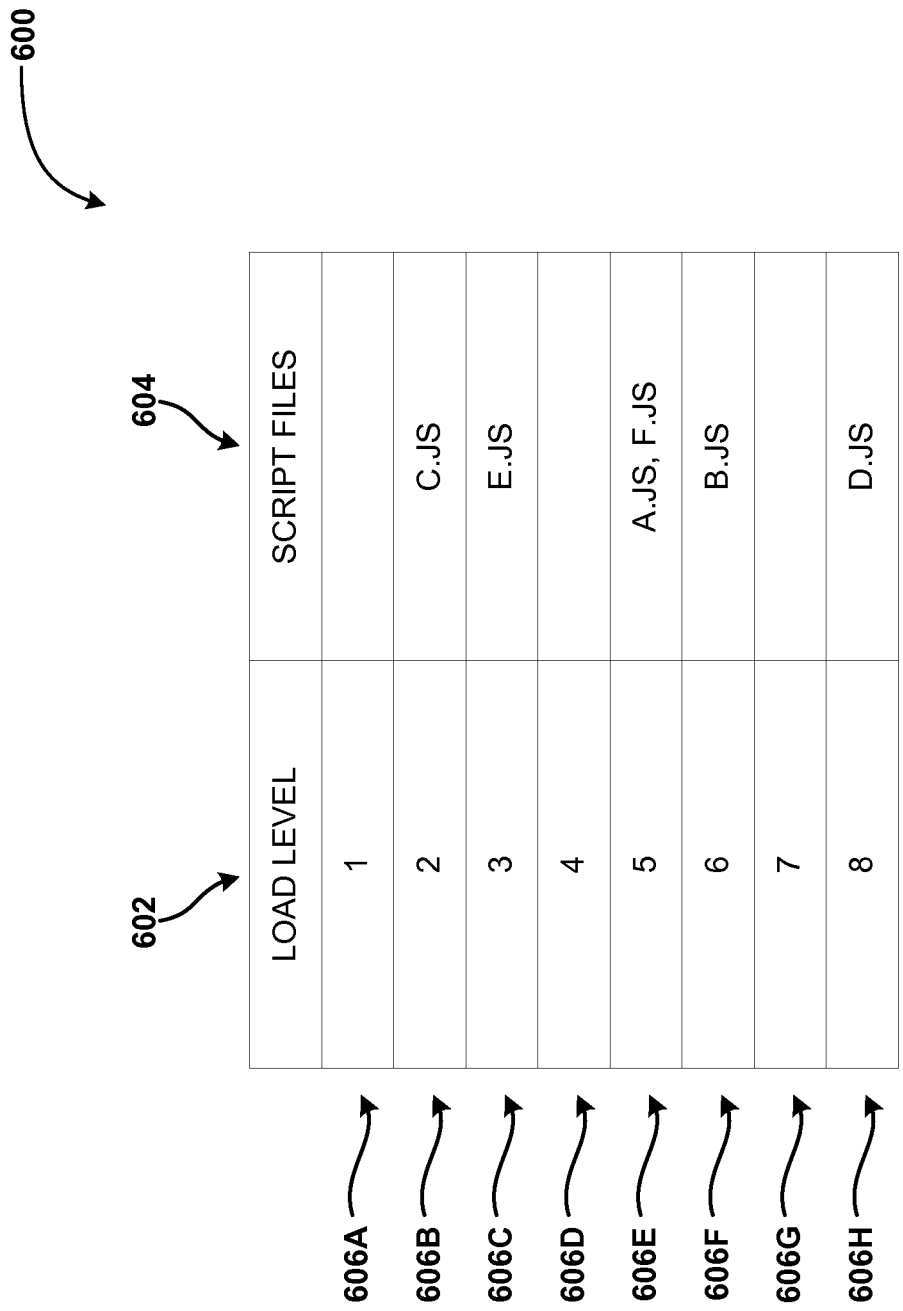
FIG. 6 is a line drawing showing a script file load level table, according to an illustrative embodiment.

Referring now to FIG. 6, a line drawing illustrating a script file load level table 600 is illustrated, according to an illustrative embodiment. According to various embodiments, the server computer 102 can generate the script file load level table 600 via execution of the methods 200, 300, 400 described above with reference to FIGS. 2-4 and/or via other processes. In the illustrated embodiment, the script file load level table 600 is generated after registering the script files 116 and/or nodes corresponding to the script files 116 with specified load levels, which can be determined based upon analysis of a page 108 and/or via a list or manifest provided to the server computer 102.

As shown in FIG. 6, the script file load level table 600 includes a column 602 for indicating a load level and a column 604 for indicating script files 116. Thus, the script file load level table 600 can include a number of rows 606A-H (hereinafter referred to collectively and/or generically as "rows 606"). A row 606 can correspond to a load level and can indicate script files 116 to be loaded at the load level corresponding to the row 606. Thus, for example, the row 606C can correspond to a third load level and can indicate that the script file 116 entitled "e.js" is to be loaded at the third load level. Because the script file load level table 600 can include fewer than or more than eight load levels and/or can include references to less than or more than six script files 116, it should be understood that the illustrated embodiment is illustrative, and should not be construed as being limiting in any way.

It should be understood that any number of load levels can be included and that the number of load levels and/or the designation of the load levels can be implementation-specific. In one contemplated example, four general categories of load levels include an on-demand load level corresponding to a script file 116 that is run when particular functionality is accessed or requested, an after-UI load level corresponding to a script file 116 that is loaded or run after a user interface is rendered, a defer load level corresponding to a script file 116 that is referenced in a script tag with a defer attribute, and/or a load inline load level such as a script file 116 referenced within a body of the page 108 code.

In another contemplated embodiment, eight load levels are associated with a particular page 108. The levels can include, but are not limited to, a first level corresponding to a script file 116 referenced in a page header as a script tag with a source ("src") attribute, a second level corresponding to a script file 116 referenced in a page head after the first level scripts, a third level corresponding to a script file 116 located in a page header as a script tag with an src attribute and a defer attribute, after level two scripts, and a fourth level corresponding to a script file 116 included in a page head as a script tag, after level three scripts, with an src attribute and a defer attribute. The load levels also can include a fifth load level corresponding to a script file 116 near the end of the body of the page 108 as a script tag with an src attribute, a sixth level corresponding to a script file 116 reference included as a script tag near the end of the body of the page 108 after the level five scripts, a seventh level corresponding to a script file 116 registered via an on-demand registration and loaded as needed, and/or an eighth level corresponding to a script file 116 registered via an on-demand registration system, after level seven script file references, and loaded as needed. Again, it should be understood that the above-described embodiments of the load levels are illustrative, and should not be construed as being limiting in any way.

The script file load level table 600 can indicate load levels associated with a particular page 108 and indications as to which script files 116 are to be loaded at each identified load level. As such, the script file load level table 600 can be provided to other entities such as the client device 110 for use in rendering the page 108. As such, the script files 116 referenced by the page 108 can be accessed, loaded, and/or executed by the server computer 102 in an order identified by the script file load level table 600. It should be understood that this embodiment is illustrative, and should not be construed as being limiting in any way.

According to one contemplated embodiment, the server computer 102 generates the script file load level table 600 via execution of the operations shown in TABLE 5 below. Because the example code shown in TABLE 5 and the script file load level table 600 shown in FIG. 6 are merely illustrative of one contemplated example, the embodiment provided in TABLE 5 should not be construed as being limiting in any way.

TABLE 5

```
Register("a.js", 5)
Register("b.js", 6)
Register("c.js", 2)
Register("d.js", 8)
Register("e.js", 3)
Register("f.js", 5)
```

Figure 7:
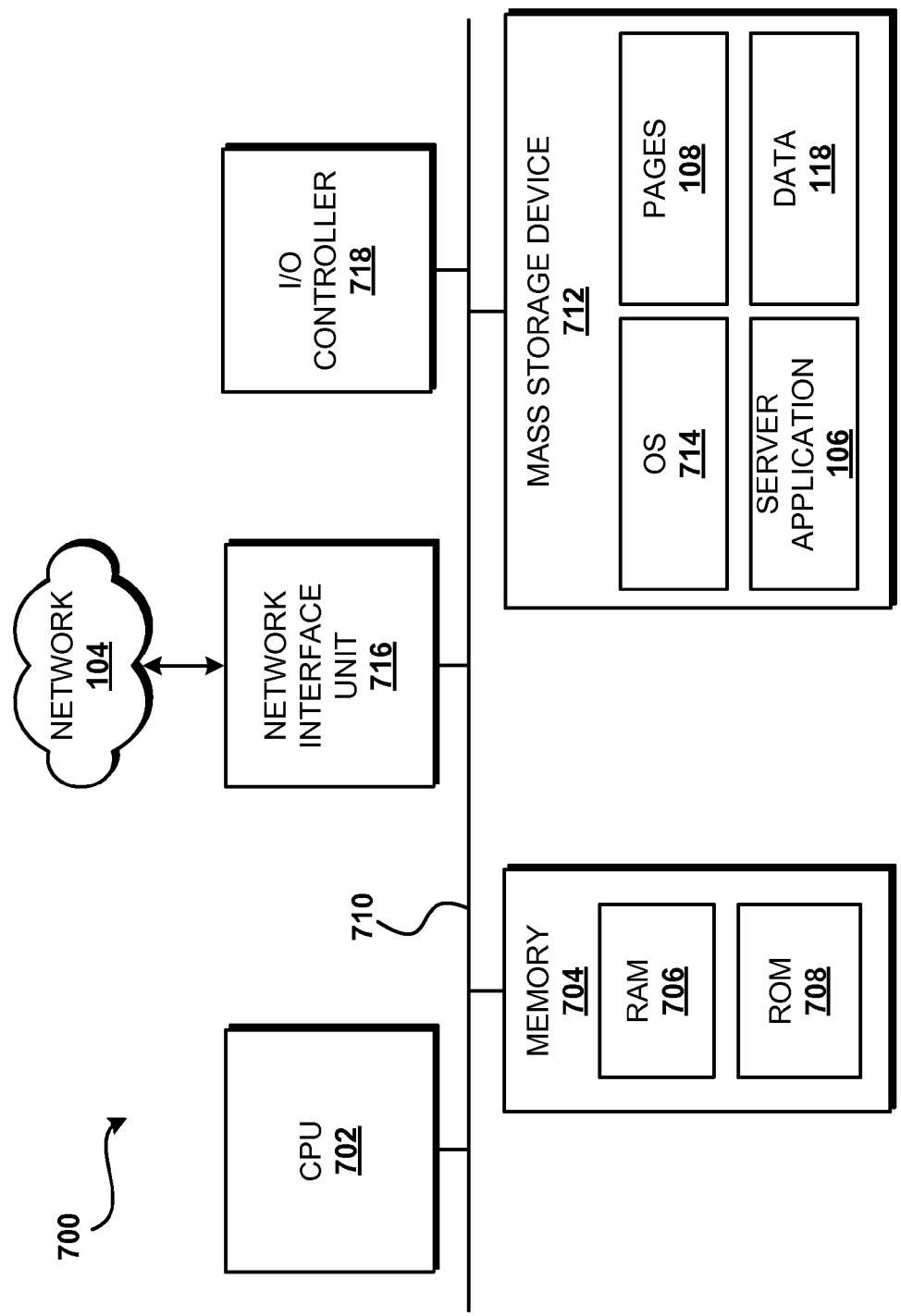
FIG. 7 is a computer architecture diagram illustrating an illustrative computer hardware and software architecture for a computing system capable of implementing aspects of the embodiments presented herein.

FIG. 7 illustrates an illustrative computer architecture 700 for a device capable of executing the software components described herein for managing script file dependencies and load times. Thus, the computer architecture 700 illustrated in FIG. 7 illustrates an architecture for a server computer, mobile phone, a PDA, a smart phone, a desktop computer, a netbook computer, a tablet) computer, and/or a laptop computer. The computer architecture 700 may be utilized to execute any aspects of the software components presented herein.

The computer architecture 700 illustrated in FIG. 7 includes a central processing unit 702 ("CPU"), a system memory 704, including a random access memory 706 ("RAM") and a read-only memory ("ROM") 708, and a system bus 710 that couples the memory 704 to the CPU 702. A basic input/output system containing the basic routines that help to transfer information between elements within the computer architecture 700, such as during startup, is stored in the ROM 708. The computer architecture 700 further includes a mass storage device 712 for storing the operating system 714, the server application 106, and/or other application programs. The mass storage device 712 also can be configured to store the pages 108, the data 118, and/or other data (not shown in FIG. 7).

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes of the claims, the phrase "computer storage medium" and variations thereof, does not include waves, signals, and/or other transitory and/or intangible communication media, per se.

According to various embodiments, the computer architecture 700 may operate in a networked environment using logical connections to remote computers through a network such as the network 104. The computer architecture 700 may connect to the network 104 through a network interface unit 716 connected to the bus 710. It should be appreciated that the network interface unit 716 also may be utilized to connect to other types of networks and remote computer systems, for example, the client device 110. The computer architecture 700 also may include an input/output controller 718 for receiving and processing input from a number of other devices, including a keyboard, mouse, or electronic stylus (not shown in FIG. 7). Similarly, the input/output controller 718 may provide output to a display screen, a printer, or other type of output device (also not shown in FIG. 7).

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

Based on the foregoing, it should be appreciated that technologies for managing script file dependencies and load times have been disclosed herein. Although the subject matter presented herein has been described in language specific to computer structural features, methodological and transformative acts, specific computing machinery, and computer readable media, it is to be understood that the invention defined in the appended claims is not necessarily limited to the specific) features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for outputting data indicating a script file dependency, the computer-implemented method comprising performing computer-implemented operations for:
receiving, at a computer, executable code corresponding to a resource including a reference to a client-side script file;
registering, at the computer, the client-side script file associated with the reference;
resolving, at the computer, a script file dependency associated with the client-side script file by
selecting the client-side script file for analysis,
determining that the client-side script file has not been previously analyzed, and
marking the client-side script file as visited in response to determining that the client-side script file has not been previously analyzed; and
outputting, at the computer, the data indicating the resolved script file dependency for the client-side script file associated with the reference, wherein the data comprises a data structure including the reference to the client-side script file and a load level at which the client-side script file is to be loaded during rendering of the resource at a client device that is in communication with the computer.

2. The method of claim 1, wherein the data further comprises a data structure comprising
a first node corresponding to the client-side script file,
a second node corresponding to a second client-side script file depended upon by the client-side script file, and
an edge between the client-side script file and the second client-side script file, the edge indicating a script file dependency between the client-side script file and the second client-side script file.

3. The method of claim 1, further comprising providing the executable code and the data to the client device, wherein the client device stores the client-side script file.

4. The method of claim 1, wherein resolving the script file dependency associated with the client-side script file further comprises identifying a further client-side script file depending upon the client-side script file.

5. The method of claim 1, wherein registering the client-side script file comprises:
creating a data structure; and
adding a node to the data structure, the node corresponding to the client-side script file.

6. The method of claim 1, wherein registering the client-side script file comprises:
creating a load level table; and
adding a reference to the load level table, the reference comprising a reference to the client-side script file and an indication of a load level associated with the client-side script file.

7. The method of claim 1, wherein the resource comprises a web page.

8. The method of claim 1, wherein the resource comprises a web application.

9. A computer storage medium comprising one or more of an optical disk, a solid state memory device, or a magnetic storage device having computer readable instructions stored thereupon that, when executed by a computer, cause the computer to:
receive code corresponding to a web resource including a reference to a client-side script file;
register the client-side script file associated with the reference;
analyze the client-side script file to identify a further client-side script file depended upon by the client-side script file;
resolve a client-side script file dependency associated with the client-side script file by
selecting the client-side script file for analysis,
determining that the client-side script file has not been previously analyzed, and
implementing a node coloring process to mark the client-side script file as analyzed in response to determining that the client-side script file has not been previously analyzed; and
output data indicating the resolved client-side script file dependency, wherein the data comprises a table including the reference to the client-side script file and a load level at which the client-side script file is to be loaded.

10. The storage medium of claim 9, wherein the computer-executable instructions for resolving the client-side script file dependency further comprise computer-executable instructions that, when executed by the computer, cause the computer to determine another client-side script file depending upon the client-side script file.

11. The storage medium of claim 9, wherein the data comprises a data structure including data corresponding to
a first node corresponding to the client-side script file,
a second node corresponding to a second client-side script file depended upon by the client-side script file, and
an edge between the client-side script file and the second client-side script file, the edge corresponding to a dependency of the client-side script file upon the second client-side script file.

12. The storage medium of claim 9, wherein the computer-executable instructions for registering the client-side script file comprise computer-executable instructions that, when executed by the computer, cause the computer to:
create a data structure; and
add a node to the data structure, the node corresponding to the client-side script file.

13. The storage medium of claim 9, wherein the computer-executable instructions for registering the client-side script file comprise computer-executable instructions that, when executed by the computer, cause the computer to:
create a load level table; and
add a reference to the load level table, the reference comprising a reference to the client-side script file and an indication of a load level associated with the client-side script file, the load level indicating a time at which the client-side script file is to be loaded during rendering of the resource.

14. A computer storage medium comprising one or more of an optical disk, a solid state memory device, or a magnetic storage device having computer readable instructions stored thereupon that, when executed by a computer, cause the computer to:
receive code corresponding to a resource, the code including references to client-side script files;
define, based upon the code, at least two load levels indicating times at which the client-side script files are to be loaded during rendering of the code;
register the client-side script files referenced by the code;
analyze the registered client-side script files to identify a further client-side script file depended upon by at least one of the client-side script files;

resolve a script file dependency associated with the further client-side script file by
selecting the at least one of the client-side script files,
determining that the at least one of the client-side script files has not been previously analyzed, and
marking the at least one of the client-side script files as visited in response to determining that the at least one of the client-side script files has not been previously analyzed; and
output data indicating the resolved script file dependency to a client device in communication with the computer.

15. The storage medium of claim 14, wherein the computer-executable instructions for resolving the script file dependency comprise computer-executable instructions that, when executed by the computer, cause the computer to determine another client-side script file depending upon the at least one of the client-side script files.

16. The storage medium of claim 14, wherein the data comprises a data structure comprising nodes corresponding to the client-side script files and at least one edge between at least two of the client-side script files, the edge indicating a script file dependency between the at least two of the client-side script files.

17. The storage medium of claim 16, wherein the data further comprises a table including a reference to the at least two client-side script files and at least one load level indicating a time at which the at least two client-side script files are to be loaded.

18. The storage medium of claim 14, wherein the computer-executable instructions for registering the client-side script files include computer-executable instructions that, when executed by the computer, cause the computer to:
create a data structure;
add nodes to the data structure, the nodes corresponding to the client-side script files;
create a load level table; and
add references to the load level table, the references comprising data indicating the client-side script files and load levels associated with the client-side script files.

19. The storage medium of claim 9, wherein the web resource comprises a web page.

20. The storage medium of claim 9, wherein the web resource comprises a web application.

* * * * *